Nov. 7, 1967 R. P. NELSON ETAL 3,351,173
MEAT EMULSION TRANSPORTATION METHOD AND APPARATUS
Filed Oct. 20, 1965
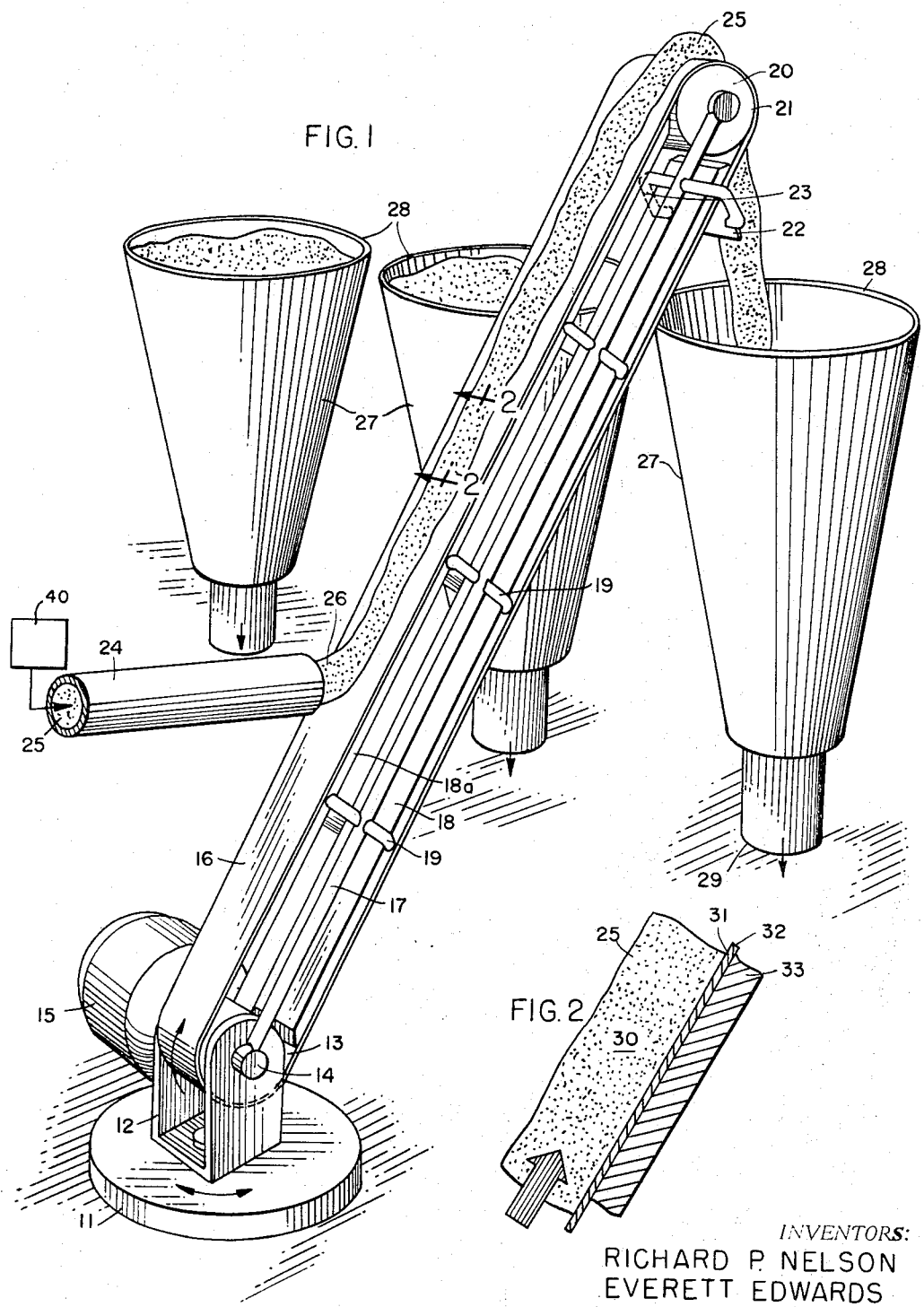
INVENTORS:
RICHARD P. NELSON
EVERETT EDWARDS
BY: Carl C. Batz
ATT'Y United States Patent Office 3,351,173
Patented Nov. 7, 1967

3,351,173
MEAT EMULSION TRANSPORTATION
METHOD AND APPARATUS
Richard P. Nelson, Kansas City, Mo., and Everett Edwards, Chicago, Ill., assignors to Armour and Company, Chicago, Ill., a corporation of Delaware
Filed Oct. 20, 1965, Ser. No. 498,487
2 Claims. (Cl. 198—1)

This invention relates to a method and apparatus for moving a sausage emulsion. The invention, more particularly, concerns the movement of a sausage emulsion in practically any direction and at every angle of elevation or incidence by a very simple conveyor system which has been designed for transporting, lifting and lowering meat emulsion.

In the manufacturing and processing of many meat products including sausage, pieces of lean and fat meats are ground in a commercial grinder and then moved to a blender where dispersions of finely-divided fat and lean meats are mixed and blended with salt, cure and spices to conform to the predetermined formulation required for the particular processed meat item to be produced. After the prescribed amount of blending, the ground and blended dispersed particles of fat and lean meats are discharged into a comminution apparatus where the batch is more finely-divided and further mixed and transported to another area for additional processing or stored to cure or await the remaining process steps.

The transportation of finely dispersed particles of meat forming an emulsion has for many years been a problem in the industry. During the industry's infancy, emulsions of meat were transported by hand labor, using shovels, tubs and wheelbarrows. Later in the development of meat processing technology, emulsions were transported by many other cumbersome and inefficient methods. Further problems in the transportation of emulsions have arisen with the advent of more stringent requirements in the standards of production set forth by local, State and Federal governments.

It is, therefore, a primary object of this invention to provide an improved apparatus and method for inexpensively and easily transporting a meat emulsion.

A further object of this invention is to provide not only a simple means and method for quickly transporting large quantities of an emulsion of meat, but one that is flexible in use and can be readily cleaned to meet the requirements of sanitation standards and yet have a low maintenance record.

Another object of this invention is to provide a method and apparatus for transporting a meat emulsion in a manner that effectively eliminates spillage and loss of material.

Other objects, advantages and features of this invention will become apparent to those skilled in the art from the following discussion, appended claims and drawing.

It has been discovered that a finely-divided meat emulsion can be pumped through a pipe and openly extruded directly upon a rapidly moving stainless steel apron-type conveyor for transportation including the lifting and lowering of the emulsion to storage bins, or elsewhere for continued processing. The meat emulsion mass is pumped or extruded out of a pipe directly onto the moving stainless steel apron in a continuous fashion so that the emulsion forms an uninterrupted train or elongated mass of product throughout its length of travel on the conveyor apron. The meat emulsion readily adheres to the surface of the smooth stainless steel apron and the bond is of such a nature that it is not necessary to have side boards along the conveyor means. The initial extrusion of emulsion on a clean apron adheres satisfactorily, but after one or two revolutions of the apron, a pre-coating or surface coating of emulsion on the apron substantially improves the meat-to-metal bond. When the emulsion is extruded onto the center of the moving conveyor, the mass has a tendency to remain substantially in its circular, elongated configuration. The strength of the emulsion-to-steel bond is such that the meat mass can be transported on the conveyor apron in practically any direction and at any angle of elevation or incidence and a scraper means must be employed to remove the emulsion from the underside of the conveyor at the point where it is to be deposited.

In the drawing, FIG. 1 is a perspective view of the apparatus in operation; and FIG. 2 is a sectional view of a portion of the meat mass and conveyor belt taken at line 2—2 in FIG. 1.

The apparatus perspectively displayed in FIG. 1 includes a movable base 11 upon which is mounted a pivotal flange support means 12, said pivotal support means is attached to the lower roller drum 13 which is held in place by axle 14 about which said drum 13 rotates, and about which the conveyor pivots in a vertical plane. Power source 15 transmits power directly to drum 13 about which the stainless steel apron 16 articulates. The conveyor frame is made up of the necessary longitudinal supports 17, floor supports 18, roof support 18a, and upright supports 19 to allow the continuous stainless steel apron 16 to move about lower roller 13 and upper roller 20. Roller 20 is movably mounted upon axle 21 which is secured on each side by longitudinal support 17. Movably mounted on the under side of the conveyor is scraper means 22 which is held by bracket 23. Bracket 23 is slidably attached to floor support 18.

The perspective view in FIG. 1 also includes a section of the pipe 24 through which the meat emulsion 25 is pumped and freely extruded at the terminal opening 26 of pipe 24 directly upon the stainless steel conveyor apron 16. Storage bins 27 have open tops 28 for loading and lower exits 29 for unloading the meat emulsion mass deposited therein.

FIG. 2, the cross-sectional view taken at line 2—2 in FIG. 1 of the drawing, shows a section 30 of the meat emulsion mass 25, the emulsion-apron contact face 31, the cross-section 32 of apron 16 and the cross-section 33 of roof support 18a.

In operation, a meat emulsion 25 having any known formulation, is pumped through a pipe 24 by a pump 40 (shown as a box) and freely extruded through terminal opening 26 directly upon a moving stainless steel conveyor apron 16. The emulsion may include lean and fat meats, salt, cure, spices, etc. in any proportions consistent with proper standards, recipes, and procedures for producing an emulsion suitable for an edible product. Since the meat emulsion has a high resistance to flow, pumping it through a pipe of any great length is not the most efficient nor satisfactory manner of transport. However, the emulsion can be readily pumped through a relatively short pipe and freely extruded onto the moving steel conveyor apron for surprisingly simple, efficient and effective movement of the viscous meat mass.

The speed or rate of travel of the stainless steel apron 16 is consistent with the velocity of the emulsion 25 being pumped through pipe 24 and extruded at the terminal opening 26. Although a rate of travel of the apron reasonably at variance with the velocity of the emulsion 16 through pipe 24 and the extrusion point 26 does not appreciably affect the transporting ability of the conveyor, it is preferred that the speed of each be approximately the same for best results. If the apron speed is in excess of the velocity of the emulsion 25 being extruded from terminal opening 26, the emulsion mass tends to be drawn and broken and spillage occurs. If the speed of apron 16 is significantly below the velocity of emulsion 25 being extruded from opening 26, the emulsion mass tends to accumulate on the apron and smooth uniform movement of the emulsion is destroyed.

When the speed of apron 16 is the same or slightly faster than the velocity of emulsion 25 through terminal point 26, the emulsion mass moves smoothly on apron 16 and around roller 20 where scraper 22 shown in FIG. 1 breaks the emulsion-to-metal contact 31 shown in FIG. 2, allowing the emulsion mass 25 to feed uninterruptedly into bin 27.

It is not fully understood why the emulsion mass 25 adheres so strongly to the stainless steel surface of apron 16. However, it has been observed that after the conveyor has been cleaned and oiled, adherence of the emulsion to the apron surface, though satisfactory, does not fully develop immediately; but, after one or two revolutions, following the commencement of emulsion extrusion, the apron retains a very light coating of emulsion that is not removed by scraper 22 and the adherence of the emulsion to the apron at contact surface 31 is fully developed. In fact, the bond is surprisingly strong and the adherence of the emulsion to the metal is such that if the scraper means is not used to remove the meat mass the emulsion train will remain on the revolving apron.

As the emulsion is freely pumped directly upon the moving conveyor apron, the emulsion train 25 is carried around roller 20 and the contact surface 31 is broken by scraper 22 permitting the emulsion to pass by gravity through the open top 28 of storage bin 27 where the finely-divided meat mass may be stored for curing or held for metering from bin 27 through the exit passage 29 for further formulation and processing. When any one bin 27 has been filled to the desired level, the embodiment of the conveyor means shown in FIG. 1 of the drawing is pivoted on base 11 by revolving flange support 12 in either direction to align the conveyor means over another bin. The angle of elevation or incidence of the conveyor means may be changed by pivoting the conveyor within a vertical plane and about axle 14 supported by flange 12 which is pivotally secured to base 11. The conveyor means may be mounted on a frame equipped with wheels or in any manner to impart maximum convenience and flexibility of use.

Because various possible embodiments might be made of the above invention and since various changes might be made in the embodiments above set forth, it is to be understood that all matters herein described or shown in the accompanying drawing, are to be interpreted as illustrative and not in a limiting sense.

Having thus described the invention, what is claimed as new, and desired to be secured by Letters Patent, is:

1. An apparatus for transporting a meat emulsion including a pipe, means to move said emulsion through said pipe, a downstream terminal opening in said pipe for extruding said mass, a conveyor means, a stainless steel apron forming a part of and movable about said conveyor means upon which said emulsion is extruded, a scraper means mounted on said conveyor to remove said extruded meat, and a base connected to said conveyor by pivotal means, said base being rotatable in a horizontal plane and said pivotal means being rotatable in a vertical plane.

2. In a process for transporting a meat emulsion, the steps of extruding said meat onto a steel conveyor apron, moving said meat thereon, and scraping said apron to remove said emulsion except for a thin layer remaining on said apron to form a precoating of emulsion on said apron.

References Cited
UNITED STATES PATENTS

| | | | |
|---|---|---|---|
| 1,975,591 | 10/1934 | Sinden | 198—230 |
| 2,820,247 | 12/1958 | Michaud | 12—32 |
| 2,855,094 | 10/1958 | Zelbarth | 198—230 |
| 2,994,561 | 8/1961 | Kelley | 302—12 |
| 2,998,122 | 8/1961 | Moor | 198—129 |
| 3,184,038 | 5/1965 | Petchuk | 198—100 |

ANDRES H. NIELSEN, *Primary Examiner.*

RICHARD E. AEGRETER, EVON C. BLUNK,
*Examiners.*